May 21, 1935.　　　　　H. J. BIRCHALL　　　　　2,001,952
LENSES AND THEIR COMBINATION AND ARRANGEMENT
IN VARIOUS INSTRUMENTS AND APPARATUS
Filed Jan. 27, 1934　　　2 Sheets-Sheet 1
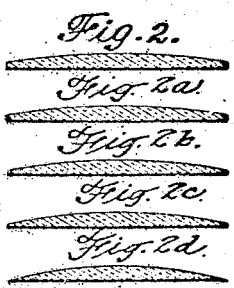
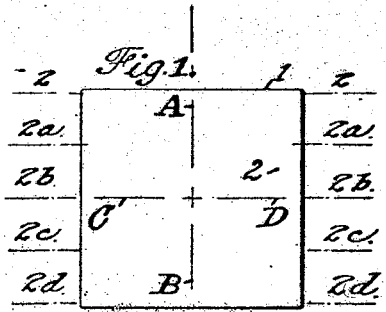
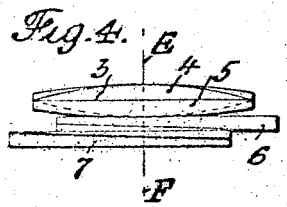
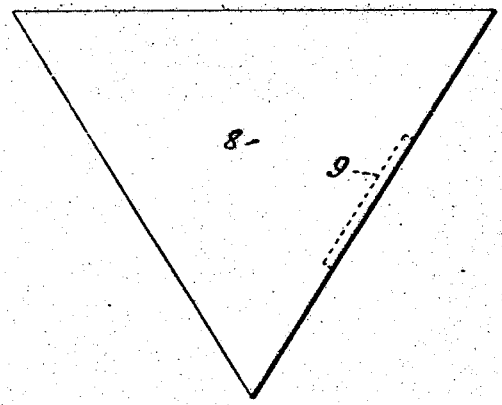
Henry James Birchall
INVENTOR
By Otto Munk
his ATTY.

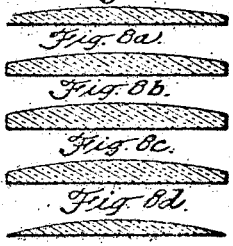
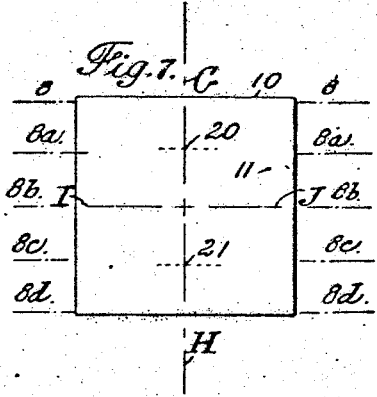
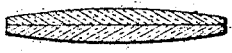
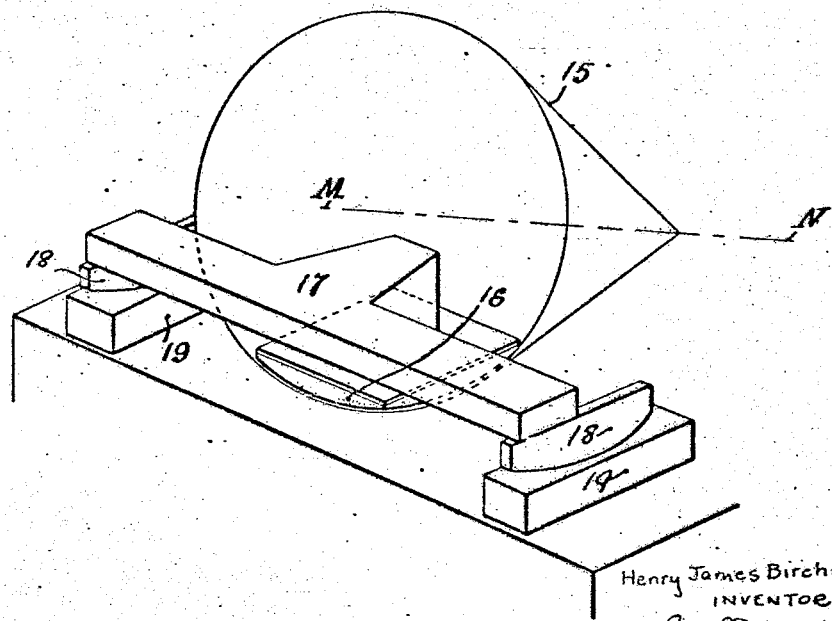

Patented May 21, 1935

2,001,952

UNITED STATES PATENT OFFICE 2,001,952

LENSES AND THEIR COMBINATION AND ARRANGEMENT IN VARIOUS INSTRUMENTS AND APPARATUS

Henry James Birchall, Shirley, England

Application January 27, 1934, Serial No. 703,582
In Great Britain December 14, 1932

2 Claims. (Cl. 88—54)

The invention relates to lenses and also to their combination and arrangement in various instruments and apparatus and provides the hereinafter described and claimed improvements.

The object of the invention is to provide a lens having gradually varying focal lengths between two extremities or points of its surface, that is to say, without visible break or step throughout the range.

A lens according to the invention has a surface whose curvature has the characteristics of a segment of a solid or hollow geometrical cone, that is to say, the radius of curvature of said surface progressively changes, in the same way as a cone segment, between two extremities or points on said surface and equally each side the axis of the lens, which axis is intended in this specification to convey a medial line along the surface of the lens and which medial line is radial of the cone formation of which the segment forms a part, and will be hereinafter referred to as the principal medial line.

Such a lens has definite uses as will be hereinafter described, as for instance, when two are arranged as a pair with coincident principal medial lines but reversely disposed and arranged for adjustment along said medial lines.

The invention also embodies a lens having characteristic curvings of a cone segment in one direction, as aforesaid, but also having an additional curving in a direction at right-angles, that is to say in the direction of the principal medial line, which additional curving preferably varies progressively to the extent of a number of diopters of difference between two points in such direction. This additional curving, in the direction of the medial line aforesaid, is so combined with the curvings across the medial line that a single lens can be used as a spectacle lens in substitution for the ordinary bi-focal lens to give gradually varying focal lengths, as for instance, between distance and reading, without any visible break or step throughout the range.

Two of such lenses may be used as a pair in an instrument or apparatus for various purposes, being placed with their medial lines coincident but reversed as to their ends, and arranged to adjust upon each other parallel to said medial lines.

This second form of the invention provides a lens which might be regarded as having a surface somewhat similar to a curve-sided cone, but the curvature in the direction of the medial line is preferably a particular curvature combined with the particular cone curvature as described with reference to the first form of lens.

The surface of the second described lens could conveniently be produced if a cone segment of the first form of lens were ground simultaneously in both directions at right-angles by the inner surface of a straight-sided revoluble cone which grinds both the cone curvings and the medial line curvings, the latter however being controlled by a former; but in commercial production these curvings would be obtained simultaneously from a glass piece.

The invention will be more clearly understood by the description hereinafter appearing with reference to the accompanying diagrammatic drawings which are by way of example only.

Fig. 1 is a front elevation of a lens having a surface characteristic of a segment of a cone.

Fig. 2 to Fig. 2$^d$ is a series of transverse sections of Fig. 1 taken at the positions indicated by the dotted lines.

Fig. 3 is a side elevation of Fig. 1.

Fig. 4 is an elevation of a combination of two pairs of lenses applied at right-angles to each other and which would be mounted for use in an instrument or apparatus.

Fig. 5 is an end elevation of Fig. 4.

Fig. 6 is a diagrammatic view illustrating the manner in which a segment is taken from a cone to form such a lens.

Fig. 7 is a front elevation of a lens according to the second form of the invention.

Fig. 8 to Fig. 8$^d$ is a series of transverse sections of Fig. 7 taken at the positions indicated by the dotted lines.

Fig. 9 is a side elevation of Fig. 7.

Fig. 10 is an elevation of a combination of two of such lenses applied longitudinally to each other for use in instruments or apparatus.

Fig. 11 is a transverse section of Fig. 10 wherein the lenses are placed to provide minimum magnification.

Fig. 12 is a transverse section of Fig. 10 wherein the lenses are placed to provide maximum magnification.

Fig. 13 is a diagrammatic perspective view of a machine for forming the surface of this form of lens.

The numeral 1 indicates a lens according to the invention which is conveniently illustrated as being square but which may be any other desirable shape. A surface 2 of this lens is formed in a manner having the characteristics of the surface of a segment of a cone, i. e., along the principal medial line AB and in all planes parallel therewith the surface 2 of the lens is flat as illustrated in Fig. 3 while along the medial line CD, at right-angles to the medial line AB, and in planes parallel therewith the surface of the lens constantly curves in progressive radii extending along the medial line AB as illustrated in Fig. 2.

Referring to Figs. 1 and 2 the radius of curvature at the position 2—2 of Fig. 1 is shown in the corresponding sectional view in Fig. 2, and the radius of curvature at the position 2ᵃ—2ᵃ of Fig. 1 is also shown in the corresponding sectional view in Fig. 2ᵃ and similarly the radii of curvature at the positions 2ᵇ—2ᵇ, 2ᶜ—2ᶜ and 2ᵈ—2ᵈ are also shown in the corresponding sectional views in Fig. 2ᵈ. As can be clearly seen by Fig. 2 the surface of the lens constantly curves in planes parallel to the medial line C—D in progressive radii extending along the medial line AB, and in any planes parallel to but intermediate of the aforesaid sectional positions 2—2, 2ᵃ—2ᵃ, et cetera the radii of curvatures are proportional. It is apparent therefore that the focal length of the lens progressively changes along the medial line AB and in planes parallel thereto.

The other surface 3 of the lens is conveniently illustrated as being plane, but would be formed in any of the convenient manners known for variations required in optical work.

Referring to Fig. 4 two such lenses, 4 and 5, are placed upon each other with their plane surfaces 3 adjacent and their principal medial lines parallel and coincident, but with the greater curvature end of one lens adjacent the lesser curvature end of the other lens. A similar pair of lenses, 6 and 7, arranged in a like manner, is applied to the pair of lenses aforesaid with the principal medial lines of the two pairs of lenses at right-angles to each other, the axis EF of the combination of the lenses being at the intersecting point of the principal medial lines of the two pairs of lenses. The pairs of lenses 4, 5 and 6, 7 are mounted in such a manner that each pair or all collectively are adjustable in a direction parallel to their principal medial lines, to thereby vary the focal length of the combination of the lens at the axis thereof and provide the effect of a variable spherical lens. In the case of one pair only a variable cylindrical lens would result.

Fig. 5 illustrates the same arrangement as Fig. 4 but in end elevation whereby the direction in which the pair of lenses 4 and 5 is adjusted can clearly be seen.

Fig. 6 illustrates a means of obtaining a lens according to this form of the invention wherein a glass cone 8 is adapted to have removed therefrom a segment 9.

Figs. 7–9 illustrate a lens 10 according to the second form of the invention, particularly intended for use in spectacles. The surface 11 of this lens varies in progressive curvature along its principal medial line GH and in planes parallel thereto to the extent of a number of diopters of difference between any two points along said surface in such direction as clearly illustrated in Fig. 9, while in a direction along the medial line IJ, at right-angles to the medial line GH, and in all planes parallel therewith the surface of the lens constantly curves in progressive radii extending along the medial line GH, in a manner characteristic of the surface of a segment of a cone. This is clearly illustrated in Figs. 8 to 8ᵈ where the sectional views respectively show the curvature of the lens across the positions indicated by 8—8, 8ᵃ—8ᵃ, 8ᵇ—8ᵇ, 8ᶜ—8ᶜ and 8ᵈ—8ᵈ. The variations of curvature may be between any two points for instance, between the points 20, 21, shown in broken lines Fig. 7, and constant from these points to the extremities of the lens.

The invention in this form therefore provides a lens which, in one direction parallel to the principal medial line, the focal length progressively varies, while at right-angles to and extending along said principal medial line the focal length also progressively varies.

The effect of such lenses in spectacles is that between the extremities of two different sightings as for distance above and reading below there is such a variation in curvature that the change is extremely gradual as opposed to abrupt with all the advantages accruing from this gradual change in both directions and without the objectionable features present in spectacles having bi-focal lenses. It will be clearly understood that given a lens with a surface according to this form of the invention the other surface thereof may be formed or worked up in any convenient manner known for variations required in optical work.

Fig. 10 illustrates a combination of two of such lenses according to this form of the invention viz. 12 and 13 placed upon each other with their plane surfaces 14 adjacent and their principal medial lines parallel and coincident, but with the greater curvature end of one lens adjacent the lesser curvature end of the other lens. This pair of lenses is mounted in such a manner that one or both collectively are adjustable in a direction parallel to their principal medial lines, to thereby vary the focal length of the combination at the axis thereof, and provide the effect of variable spherical lens.

The lens according to this second form of the invention is therefore substantially of the same progressive power each side the principal medial line as it is on said principal medial line and to the full extent of the progression.

The lens according to the second form of the invention can be produced in various ways, but one machine for the purpose is illustrated in Fig. 13 and comprises a hollow cone 15 revoluble about its axis M. N. combined with a transverse carrier 17 carrying the lens 16 and attached at each end to formers 18 having working under surfaces which are an exact shape replica of the lens to be produced in the direction of the principal medial line, these two formers rolling against stationary surfaces 19 which are parallel with the side of the cone surface which shapes the lens. The machine works in such a manner that while the cone 15 revolves the carrier 17 and formers 18 are rocked upon the stationary surfaces 19, thus simultaneously producing the curvings along and parallel with the principal medial line, and also the curving at right-angles to the principal medial line.

While the lens according to the second form of the invention has extensive use for spectacles and also uses as a pair in an instrument or appliance as for instance for the purpose of eyesight testing and correction, the lens according to the first form of the invention is principally of value when a pair is used or two pairs are used in an instrument such as would be useful for the purpose of eyesight testing and correction.

Having now described my invention, what I claim and desire to secure by Letters Patent is:—

1. A pair of lenses each having a surface which in one of two directions at right-angles, varies in progressive curvature to the extent of a number of diopters of difference between two points along said surface, and also which in the other direction constantly curves in progressive radii extending along the first direction between said two points combined for co-operation and adjustment in an instrument with their plane surfaces adjacent and their principal medial lines parallel and coincident, but also with the greater curvature end of one lens adjacent the lesser curvature end of the other lens, such pair of lens being collectively adjustable in a direction parallel to their principal medial lines.

2. A lens of variable focal power without any abrupt change, in which the principal face of the lens is formed with a curved surface whose lines of intersection with planes at right angles to said surface and to the principal medial line of the lens are circular arcs the radii of which vary progressively as the plane of section moves in the direction of said medial line, to thereby simulate the surface of a straight-sided cone, while the lines of intersection with planes at right angles to the surface and parallel to the said medial line are all substantially alike and each of progressively varying curvature, to thereby simulate involutorial curves, the back surface of the lens being left without definite shaping for subsequent shaping to combine with the shapings on the principal surface to complete the prescription of lens to the oculist's requirements.

HENRY JAMES BIRCHALL.